United States Patent [19]
Katoh et al.

[11] Patent Number: 5,579,745
[45] Date of Patent: Dec. 3, 1996

[54] ENGINE CONTROL SYSTEM

[75] Inventors: Masahiko Katoh; Kimihiro Nonaka; Kazuhiro Nakamura, all of Hamamatsu, Japan

[73] Assignee: Sanshin Kogyo Kabushiki Kaisha, Hamamatsu, Japan

[21] Appl. No.: 474,395

[22] Filed: Jun. 7, 1995

[30] Foreign Application Priority Data

Jun. 24, 1994 [JP] Japan .................... 6-143666

[51] Int. Cl.⁶ .................... F02D 41/00
[52] U.S. Cl. .................... 123/679
[58] Field of Search .................... 123/679, 676, 123/435, 436, 481, 488, 672, 434, 198 P, 73 R; 364/431.05

[56] References Cited

U.S. PATENT DOCUMENTS

| | | | |
|---|---|---|---|
| 4,831,820 | 5/1989 | Lassanske | 60/276 |
| 4,903,648 | 2/1990 | Lassankse | 60/276 |
| 4,967,727 | 11/1990 | Takahashi et al. | 123/481 |
| 5,040,513 | 8/1991 | Schnaibel et al. | 123/488 |
| 5,131,371 | 7/1992 | Wahl et al. | 123/436 |
| 5,174,261 | 12/1992 | Fujii et al. | 123/435 |
| 5,381,771 | 1/1995 | Leshner | 123/436 |
| 5,426,587 | 6/1995 | Imai et al. | 364/431.05 |

*Primary Examiner*—Raymond A. Nelli
*Attorney, Agent, or Firm*—Knobbe, Martens, Olson & Bear

[57] ABSTRACT

A feedback control system for maintaining the air/fuel ratio in a two-cycle internal combustion engine employing an oxygen sensor that senses the combustion products in a combustion chamber at the end of the combustion cycle. The feedback control system is discontinued when a misfire condition exists and the fuel amount supplied is decreased until the misfired condition subsides and then feedback control is returned.

24 Claims, 7 Drawing Sheets

ENGINE CONTROL SYSTEM

BACKGROUND OF THE INVENTION

This invention relates to an engine control system and, more particularly, to an improved feedback control system for an engine.

As has been known, it is extremely desirable to maintain the fuel/air ratio in the cylinders at the stoichiometric or leaner than stoichiometric running condition. This will promote not only good fuel economy but effective exhaust ignition control.

Various control systems have been proposed for this purpose and a very popular system employs a feedback control employing an exhaust sensor. The exhaust sensor senses the condition of the exhaust gases and from that is able to determine whether the mixture is rich or lean in the combustion chamber from the contents of the exhaust gases. Through a feedback control system, the amount of fuel supplied and/or air supplied is varied so as to maintain the desired fuel/air ratio. This type of system is very effective.

The application of this type of control, however, to a two-cycle engine presents certain difficulties. One reason for this is that the exhaust gases in a two-cycle engine may in fact indicate a condition other than that that is representative of the combustion at the end of the combustion cycle. The reason for this is that two-cycle engines, because of their more frequent firing and their scavenging systems, can have a fresh fuel/air mixture present in the combustion chamber and also passing through the exhaust system. If this fresh mixture is mixed with the exhaust products, then the sensor will obtain a false reading.

There has, therefore, been proposed a type of system wherein the exhaust sensor actually senses the combustion products in a single cylinder immediately at the time of completion of combustion. This is done in a variety of manners and one very effective way of achieving this result is shown and described in the copending application of Masahiko Katoh, Ser. No. 08/435,715, filed May 5, 1994 and assigned to the assignee hereof. In certain embodiments of that application, the exhaust sensor receives exhaust gases from one cylinder through a port that communicates with the cylinder at approximately the time when the exhaust port opens and before the scavenge port has been opened. This gas is then transmitted to an accumulator chamber in which a sensor is positioned and this chamber is discharged to another cylinder of the engine that is operating on another cycle so that the flow will, in essence, be in a constant direction from the cylinder being sensed.

One problem attendant with exhaust sensors of this type, particularly when the sensor is an oxygen (O2) sensor is that if the engine misfires, which is usually a result of an overly rich mixture, the sensor may actually sense a lean condition. The reason is that when misfire occurs unburned fuel may deposit on the oxygen sensor and the system senses a lean mixture and thus provides additional fuel to the engine, thus aggravating the misfiring condition.

It is, therefore, a principal object of this invention to provide an improved feedback control system for an engine employing an oxygen sensor.

It is a further object of this invention to provide a feedback control system for an engine wherein a different control routine is adopted in the event of engine misfires.

It is a still further object of this invention to provide an improved misfired detection and feedback and control system for two-cycle engines.

SUMMARY OF THE INVENTION

This invention is adapted to be embodied in a control system for an internal combustion engine having a combustion chamber. A charge forming and induction system supplies a charge to the combustion chamber. Means ignites the charge in the combustion chamber and exhaust means for discharging exhaust products from the combustion chamber. A detector is provided for sensing the combustion products and providing a signal indicative of the mixture strength in said combustion chamber. Control means provide a feedback control of the charge forming and induction system for maintaining the desired air/fuel ratio. The control means include means for sensing when a misfire has occurred and discontinuing the feedback control in such event. A leaner fuel/air mixture is supplied to the engine until the misfired condition has passed and then control revert to a feedback control system.

DETAILED DESCRIPTION OF THE PREFERRED EMBODIMENT OF THE INVENTION

Figure 1:
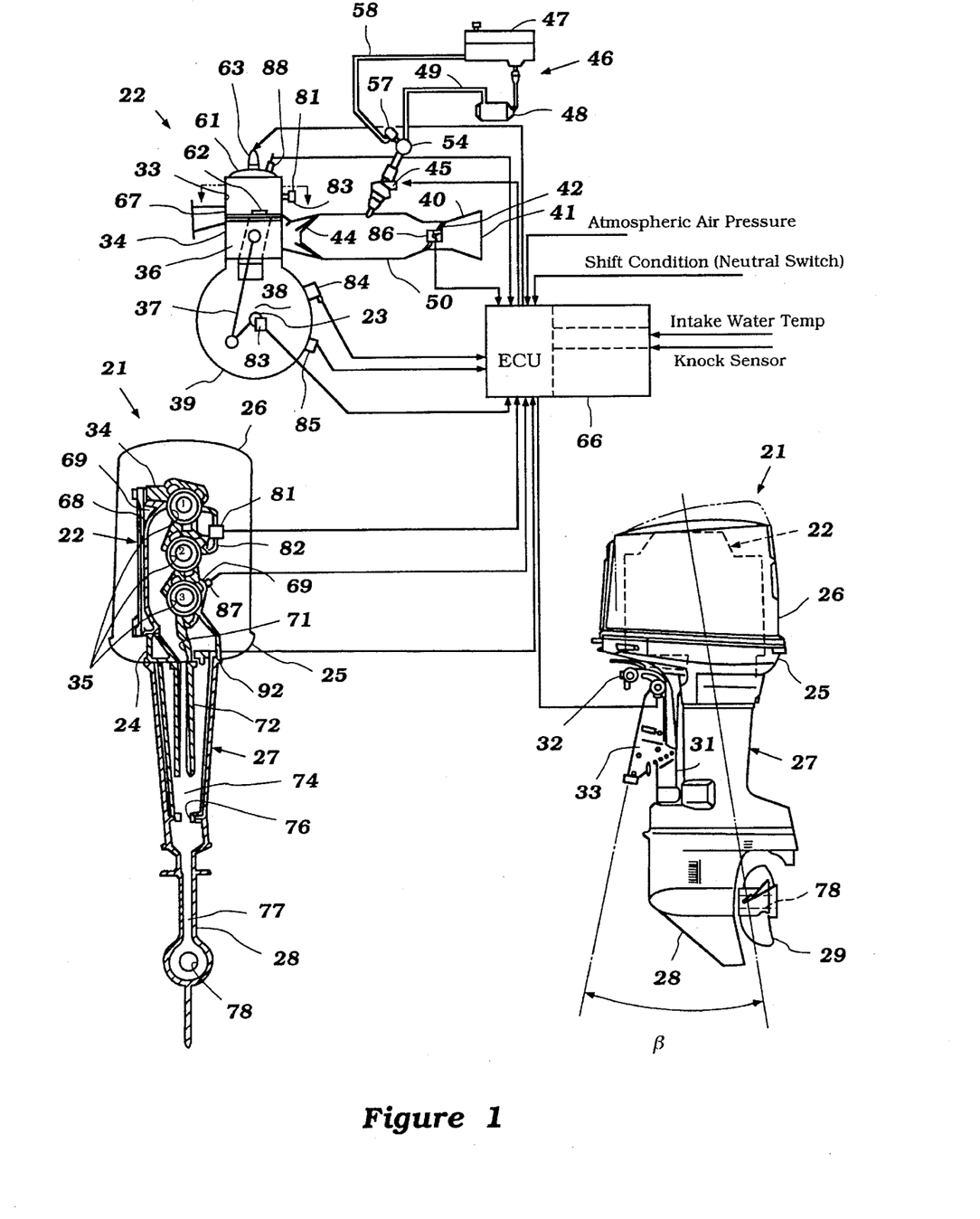
FIG. 1 is a three-part view showing an outboard motor constructed in accordance with an embodiment of the invention and side elevational view in the lower right-hand side, a cross-sectional view taken along a generally vertically extending plane on the lower left-hand side view and a schematic horizontal cross-sectional view through one cylinder of the engine and showing the control system and control elements partially in schematic form.

Referring now in detail to the drawings, and initially to FIG. 1, an outboard motor is shown in the lower portion of this figure in rear cross section and side elevation and is indicated generally by the reference numeral 21. The invention is shown in conjunction with an outboard motor because the invention has particular utility in conjunction with two-cycle crankcase compression engines. Such engines are normally used as the propulsion device for outboard motors. For these reasons, the full details of the outboard motor 21 will not be described and have not been illustrated. Those skilled in the art can readily understand how the invention can be utilized with any known type of outboard motor.

The outboard motor 21 includes a power head that is comprised of a powering internal combustion engine, indicated generally by the reference numeral 22. The engine 22 is shown in the lower view of FIG. 1, with a portion broken away, and in a schematic cross-sectional view through a single cylinder in the upper view of this figure. The construction of the engine 22 will be described later, but it should be noted that the engine 22 is mounted in the power head so that its crankshaft, indicated by the reference numeral 23, rotates about a vertically extending axis. The engine 22 is mounted on a guide plate 24 provided at the lower end of the power head and the upper end of a drive shaft housing, to be described. Finally, the power head is completed by a protective cowling comprised of a lower tray portion 25 and a detachable upper main cowling portion 26.

The engine crankshaft 23 is coupled to a drive shaft (not shown) that depends into and is rotatably journaled within the aforenoted drive shaft housing which is indicated by the reference numeral 27. This drive shaft then continues on to drive a forward/neutral/reverse transmission, which is not shown but which is contained within a lower unit 28. This transmission provides final drive to a propeller 29 in any known manner for propelling an associated watercraft.

A steering shaft (not shown) is affixed to the drive shaft housing 27. This steering shaft is journaled for steering movement within a swivel bracket 31 for steering of the outboard motor 21 and the associated watercraft (not shown) in a well-known manner. The swivel bracket 31 is, in turn, pivotally connected by a pivot pin 32 to a clamping bracket 33. The clamping bracket 33 is adapted to be detachably affixed to the transom of the associated watercraft. The pivotal movement about the pivot pin 32 accommodates trim and tilt-up operation of the outboard motor 21, as is well known in this art.

Continuing to refer to FIG. 1 and now primarily to the lower left-hand side view and the upper view, the engine 22 is depicted as being of the two-cycle crankcase compression type and, in the specific illustrated embodiment, is of a three-cylinder in-line configuration. Although this particular cylinder configuration is illustrated, it will be apparent to those skilled in the art how the invention may be employed with engines having other numbers of cylinders and other cylinder orientations. In fact, certain facets of the invention may also be employed with rotary or other ported type engines.

The engine 22 includes a cylinder block 34 in which three cylinder bores 35 are formed. Pistons 36 reciprocate in these cylinder bores 35 and are connected by means of connecting rods 37 to the crankshaft 23. The crankshaft 23 is, in turn, journaled for rotation within a crankcase chamber 38 in a suitable manner. The crankcase chamber 38 is formed by the cylinder block 34 and a crankcase member 39 that is affixed to it in any known manner.

As is typical with two-cycle crankcase compression engine practice, the crankcase chambers 38 associated with each of the cylinder bores 35 are sealed relative to each other in an appropriate manner. A fuel-air charge is delivered to each of the crankcase chambers 28 by an induction system which is comprised of an atmospheric air inlet device 40 which draws atmospheric air through an inlet 41 from within the protective cowling. This air is admitted to the protective cowling in any suitable manner.

A throttle body assembly 42 is positioned in an intake manifold 50 downstream of the air inlet 41 and is operated in any known manner. Finally, the intake system discharges into intake ports 43 formed in the crankcase member 39. Reed-type check valves 44 are provided in each intake port 43 for permitting the charge to be admitted to the crankcase chambers 38 when the pistons 36 are moving upwardly in the cylinder bore 35. These reed-type check valves 44 close when the piston 36 moves downwardly to compress the charge in the crankcase chambers 38, as is also well known in this art.

Fuel is added to the air charge inducted into the crankcase chambers 38 by a suitable charge former. In the illustrated embodiment, this charge former includes fuel injectors 45, each mounted in a respective branch of the intake manifold downstream of the respective throttle valve 42. The fuel injectors 45 are preferably of the electronically operated type. That is, they are provided with an electric solenoid that operates an injector valve so as to open and close and deliver high-pressure fuel directed toward the intake port 43.

Fuel is supplied to the fuel injectors 45 under high pressure through a fuel supply system, indicated generally by the reference numeral 46. This fuel supply system 46 includes a fuel tank 47 which is positioned remotely from the outboard motor 21 and preferably within the hull of the watercraft propelled by the outboard motor 21. Fuel is pumped from the fuel tank 47 by means of a fuel pump 48, which may be electrically or otherwise operated. This fuel then passes through a fuel filter, which preferably is mounted within the power head of the outboard motor 21. Fuel flows from the fuel filter through a conduit 49 to a high-pressure fuel pump which is driven in any known manner as by an electric motor or directly from the engine 22. This fuel pump delivers fuel under high pressure to a fuel rail 59 through a conduit. The fuel rail 54 serves each of the injectors 45 associated with the engine.

A return conduit 56 extends from the fuel rail 54 to a pressure regulator 57. The pressure regulator 57 controls the maximum pressure in the fuel rail 54 that is supplied to the fuel injectors 45. This is done by dumping excess fuel back to the fuel supply system through a return line 58 for example back to the fuel tank 47.

The fuel-air charge which is formed by the charge-forming and induction system as thus far described is transferred from the crankcase chambers 38 to combustion chambers, indicated generally by the reference numeral 59, of the engine. These combustion chambers 59 are formed by the heads of the pistons 36, the cylinder bores 35, and a cylinder head assembly 61 that is affixed to the cylinder block 34 in any known manner. The charge so formed is transferred to the combustion chamber 59 from the crankcase chambers 38 through one or more scavenge passages 62.

Spark plugs 63 are mounted in the cylinder head 61 and have their spark gaps extending into the combustion chambers 59. The spark plugs 63 are fired by a capacitor discharge ignition system (not shown). This outputs a signal to a spark coil which may be mounted on each spark plug 63 for firing the spark plug 63 in a known manner.

The capacitor discharge ignition circuit is operated, along with certain other engine controls by an engine management ECU, shown schematically and identified generally by the reference numeral 66.

When the spark plugs 63 fire, the charge in the combustion chambers 59 will ignite and expand so as to drive the pistons 36 downwardly. The combustion products are then discharged through exhaust ports 67 formed in the cylinder block 34. These exhaust gases then flow through an exhaust manifold identified by the reference numeral 68. The exhaust gases then pass downwardly through an opening in the guide plate 24 to an appropriate exhaust system (in the drive shaft housing 27) for discharge of the exhaust gases to the atmosphere. Conventionally, the exhaust gases are discharged through a high-speed under-the-water discharge and a low-speed, above-the-water discharge. The systems may be of any type known in the art.

The engine 22 is water cooled, and for this reason, the cylinder block 34 is formed with a cooling jacket 69 to which water is delivered from the body of water in which the watercraft is operating. Normally, this coolant is drawn in through the lower unit 28 by a water pump positioned at the interface between the lower unit 28 and the drive shaft housing 27 and driven by the drive shaft. This coolant also circulates through a cooling jacket formed in the cylinder head 61. After the water has been circulated through the engine cooling jackets, it is dumped back into the body of water in which the watercraft is operating. This is done in any known manner and may involve the mixing of the coolant with the engine exhaust gases to assist in their silencing. This will also be described later.

Although not shown in the drawings, the engine 22 is also provided with a lubricating system for lubricating the various moving components of the engine 22. This system may spray lubrication into the intake passages in proximity to the fuel injector nozzles 45 and/or may deliver lubricant directly to the sliding surfaces of the engine 22. This lubricant is supplied from a suitably positioned tank.

The exhaust system for discharging the exhaust gases to the atmosphere will be described. As has been noted, the exhaust manifold 68 communicates with an exhaust passage, indicated by the reference numeral 71, that is formed in the spacer or guide plate 24. An exhaust pipe 72 is affixed to the lower end of the guide plate 24 and receives the exhaust gases from the passage 71.

The exhaust pipe 72 depends into an expansion chamber 74 formed within the outer shell of the drive shaft housing 27. This expansion chamber 74 is defined by an inner member which has a lower discharge opening 76 that communicates with an exhaust chamber 77 formed in the lower unit 28 and to which the exhaust gases flow.

A through-the-hub, high speed, exhaust gas discharge opening 78 is formed in the hub of the propeller 29 and the exhaust gases exit the outboard motor 22 through this opening below the level of water in which the watercraft is operating when traveling at high speeds. In addition to this high speed exhaust gas discharge, the outboard motor 21 may be provided with a further above-the-water, low speed, exhaust gas discharge (not shown). As is well know in this art, this above-the-water exhaust gas discharge is relatively restricted, but permits the exhaust gases to exit without significant back pressure when the watercraft is traveling at a low rate of speed or is idling, and the through-the-hub exhaust gas discharge 78 will be deeply submerged.

It has been noted that the ECU 66 controls the capacitor discharge ignition circuit and the firing of the spark plugs 63. In addition, the ECU controls the fuel injectors 45 so as to control both the beginning and duration of fuel injection and the regulated fuel pressure, as already noted. The ECU 66 may operate on any known strategy for the spark control and fuel injection control 45, although this system employs an exhaust sensor assembly indicated generally by the reference numeral 81 constructed in accordance with any of the embodiments of the aforenoted copending application Ser. No. 08/435,715. Specifically, the embodiment illustrated here embodies the same sensor construction as shown in FIGS. 1–10 of that copending application. Since the invention in this application deals primarily with the control system rather than the construction of the sensor, the sensor per se will not be described in detail. However, the principal of operation of the sensor will be described later when the mode of operation of the preferred embodiment of this invention is described.

The sensor 81 is positioned in a conduit 82 that is interconnected between two of the cylinders (cylinders 1 and 2 in the illustrated embodiment) for a reason which will also be described later.

So as to permit engine management, a number of additional sensors are employed. Some of these sensors are illustrated either schematically or in actual form, and others are not illustrated. It should be apparent to those skilled in the art, however, how the invention can be practiced with a wide variety of control strategies other than or in combination with those which form the invention.

The sensors as shown schematically in FIG. 1 include a crankshaft position sensor 83 which senses the angular position of the crankshaft 23 and also the speed of its rotation. A crankcase pressure sensor 84 is also provided for sensing the pressure in the individual crankcase chambers 38. Among other things, this crankcase pressure signal may be employed as a means for measuring intake air flow and, accordingly, controlling the amount of fuel injected by the injector 45, as well as its timing.

A temperature sensor 85 may be provided in the crankcase chamber 38 for sensing the temperature of the intake air. In addition, the position of the throttle valve 42 is sensed by a throttle position sensor 86. Engine temperature is sensed by a coolant temperature sensor 87 that is mounted in an appropriate area in the engine cooling jacket 69. An in-cylinder pressure sensor 88 may be mounted in the cylinder head 61 so as to sense the pressure in the combustion chamber 59.

Other sensors which are not shown but their outposts to the ECU are noted in FIG. 1 include a knock sensor may also be mounted in the cylinder block 34 for sensing the existence of a knocking condition. Certain ambient conditions also may be sensed, such as atmospheric air pressure, intake cooling water temperature, this temperature being the temperature of the water that is drawn into the cooling system before it has entered the engine cooling jacket 69.

In accordance with some portions of the control strategy, it may also be desirable to be able to sense the condition of the transmission for driving the propeller 29 or at least when it is shifted into or out of neutral. Thus, a transmission condition sensor is mounted in the power head and cooperates with the shift control mechanism for providing the appropriate indication as indicated schematically.

Furthermore, a trim angle sensor 91 is provided for sensing the angular position of the swivel bracket 31 relative to the clamping bracket 33 and the trim angle $\beta$ of the outboard motor 21.

Finally, the engine exhaust gas back pressure is sensed by a back pressure sensor that is positioned within the expansion chamber 74 which forms part of the exhaust system for the engine and which is positioned in the drive shaft housing 27.

Figure 2:
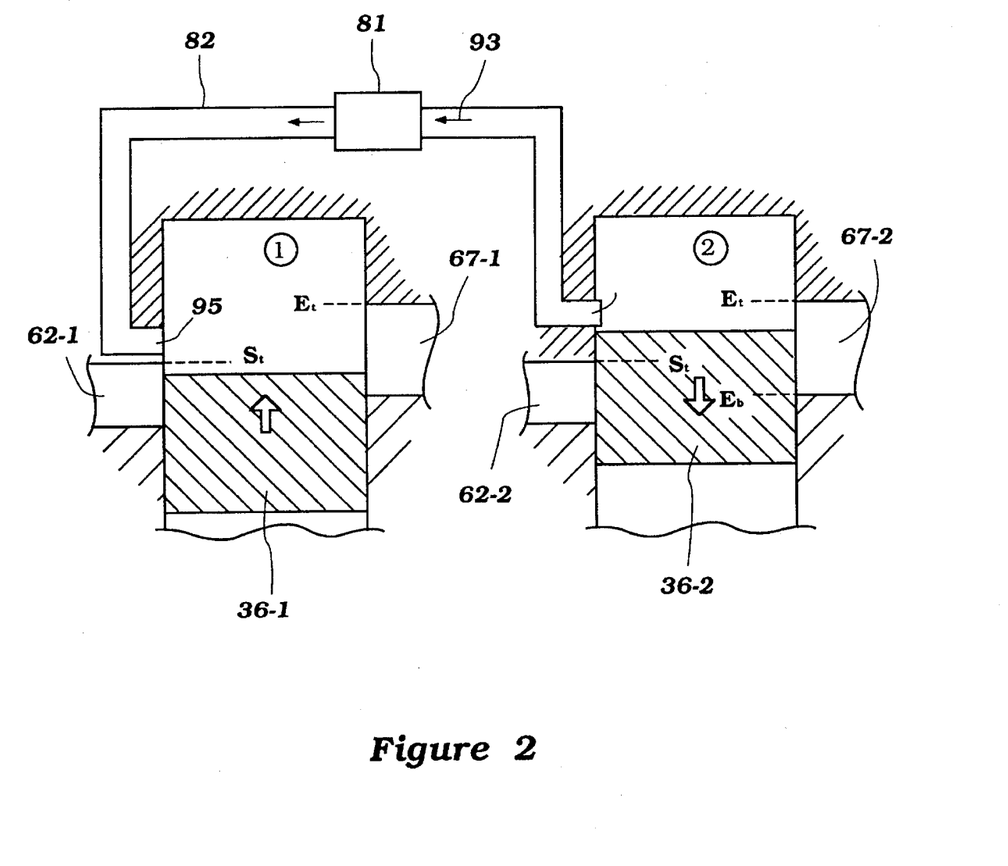
FIG. 2 is an enlarged schematic cross-sectional view taken through two cylinders of the engine and showing the connection of the exhaust sensor thereto.

The way in which the exhaust sensor 81 operates so as to sample the combustion products from one of the cylinders at the end of the combustion cycle without being diluted with incoming charge is described in more detail in the aforenoted copending application but the theory will be described by particular reference to FIGS. 2 and 3 since they indicate how the system provides good sampling and undiluted sampling so that the exhaust sensor 81, which as has been noted is an $O_2$ sensor, can provide good feedback control.

Basically, the theory of operation is that the conduit 82 that supplies the sample of combustion products to the sensor 81 is interconnected between two cylinders that are out of phase with each other. In the illustrated embodiment, these are the cylinders 1 and 2 numbering the cylinders from the top and wherein cylinder 2 is the active cylinder from which the combustion products are sampled. Cylinder 1 acts, in effect, as a valve to control the direction of flow so that it is generally in the direction of the arrows 93 shown in FIG. 2 so that the combustion products from cylinder 2 are sampled and also they are sampled at a point at the end of the combustion cycle.

Basically, the conduit 82 has a port opening 94 into cylinder 2 at a point that is approximately equal to the point when the exhaust port 67-2 is open ($E_t$). This is at a time when the combustion in cylinder 2 is substantially completed and the exhaust port will open so that the exhaust gases can flow out of the exhaust port 67-2. As may be seen in FIG. 3, which is a pressure trace of the cylinder pressures with the cylinder 2 pressure being indicated at P2 and the pressure in cylinder 1 being indicated at P1. It will be seen that when the piston 36-2 sweeps across the port 94 the pressure in the combustion chamber of cylinder 2 will have been falling because the gases have been burning and expanding. At the point in time when the exhaust port opens the pressure will continue to be dropping but it will still be greater than the atmospheric pressure indicated at the value 1 in FIG. 3.

The conduit 82 also has a port opening 95 which communicates with cylinder 1 but this port opening is disposed to be immediately adjacent the point when the scavenge port 62-1 of cylinder 1 is closed by the upward movement of the piston 36-1. Hence, there will be a positive flow from the cylinder 2 to the cylinder 1 through the sensor 81 and conduit 82 at this time period. At this point in time, cylinder 1 will have its pressure generally at atmospheric pressure because the charge which has been compressed in the crankcase chamber and is transferred to the combustion chamber will not have undergone any further pressure in the cylinder 1. Hence, the flow is in the direction of the arrow 93.

As may be seen, when the piston 36-2 continues to move downwardly eventually the scavenge port 62-2 will open and then the diluting charge will enter the combustion chamber of cylinder 2. However, by this time the port 95 in cylinder 1 will have been closed and hence no flow can occur through the conduit 82 and the sensor 81 will only receive final combustion products from cylinder 2 at the end of the cycle.

Figure 3:
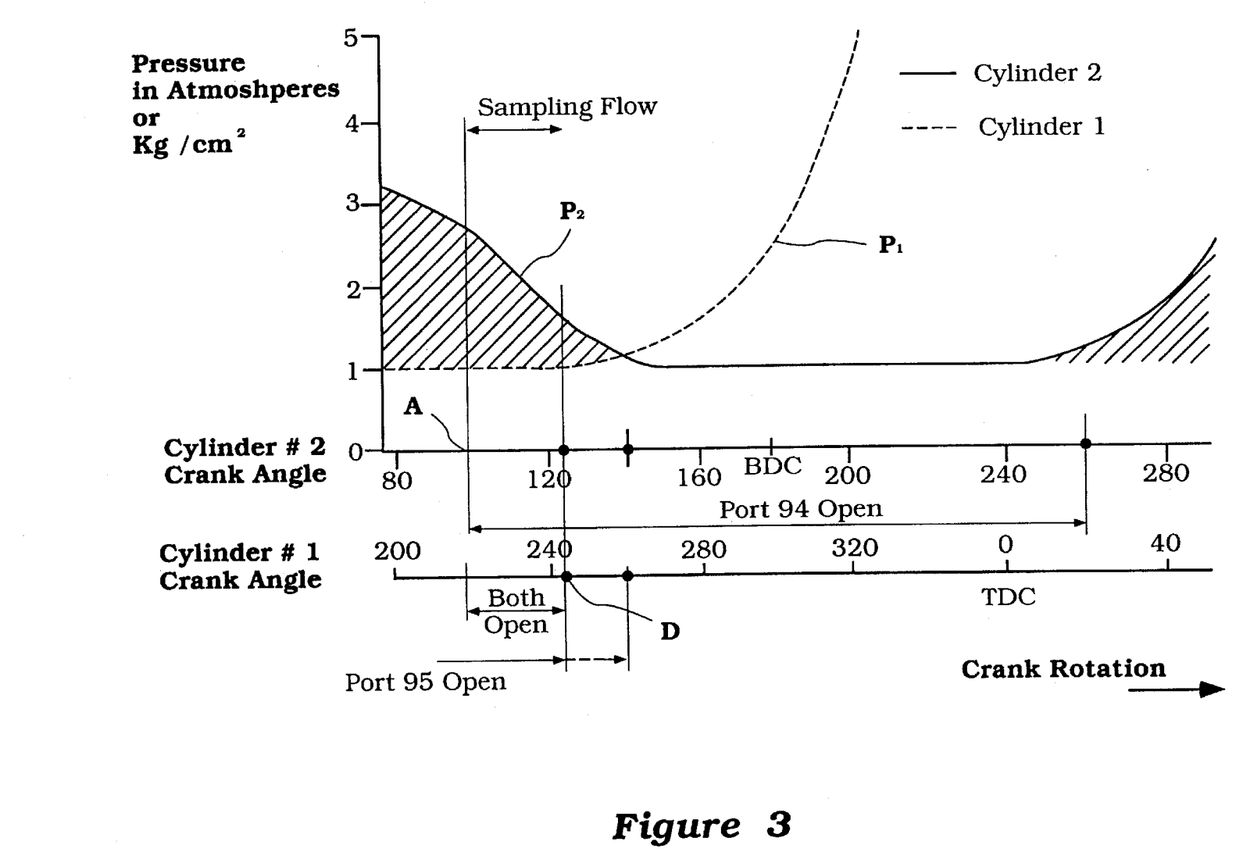
FIG. 3 is a graphical view showing the relationship of the pressure in the various cylinders and to illustrate how the exhaust sampling is controlled.

The sampling time is as indicated on the timing diagram of FIG. 3 and this being basically the time when both ports 94 and 95 are open. In fact, when port 95 is closed and port 94 is still open, the pressure in the conduit 82 will be higher than the pressure in the cylinder 2 and hence there will actually be some purging of the accumulator chamber containing the sensor 81 back into the cylinder 2 so that the sensor 81 always receives a fresh charge of combustion products for each cycle.

Because the port opening 94 of the conduit 82 in cylinder 2 is higher in the cylinder bore than the port opening 95 in cylinder 1, port opening 94 will be open for a longer period of time than will the opening of port 95. These respective timings are indicated in the distance between the points A and D in FIG. 3 and this is the time when the actual sampling will occur.

Figure 4:
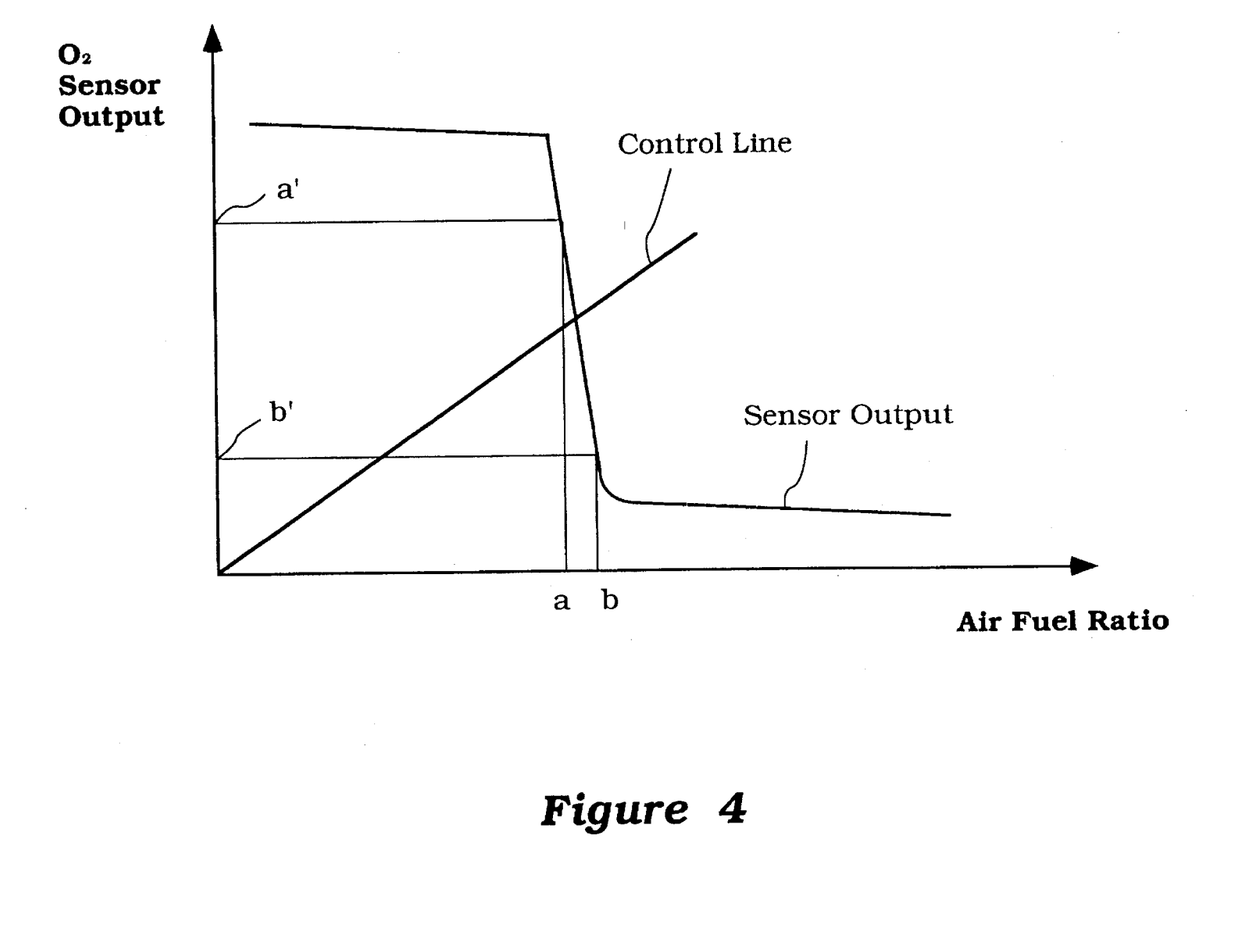
FIG. 4 is a graphical view showing the output of an oxygen sensor in relation to air/fuel ratio and the control range applied.

As is well known, sensors like the oxygen sensor 81, although they are very useful in providing an indication of mixture strength for feedback control, are basically on/off devices. FIG. 4 shows the sensor output curve and how the sensor output varies significantly in a very small range relative to the actual change in air/fuel ratio. Therefore, it is desirable to operate on the control line indicated in this figure in the range a-b/a'b' so as to provide the control.

Figure 6:
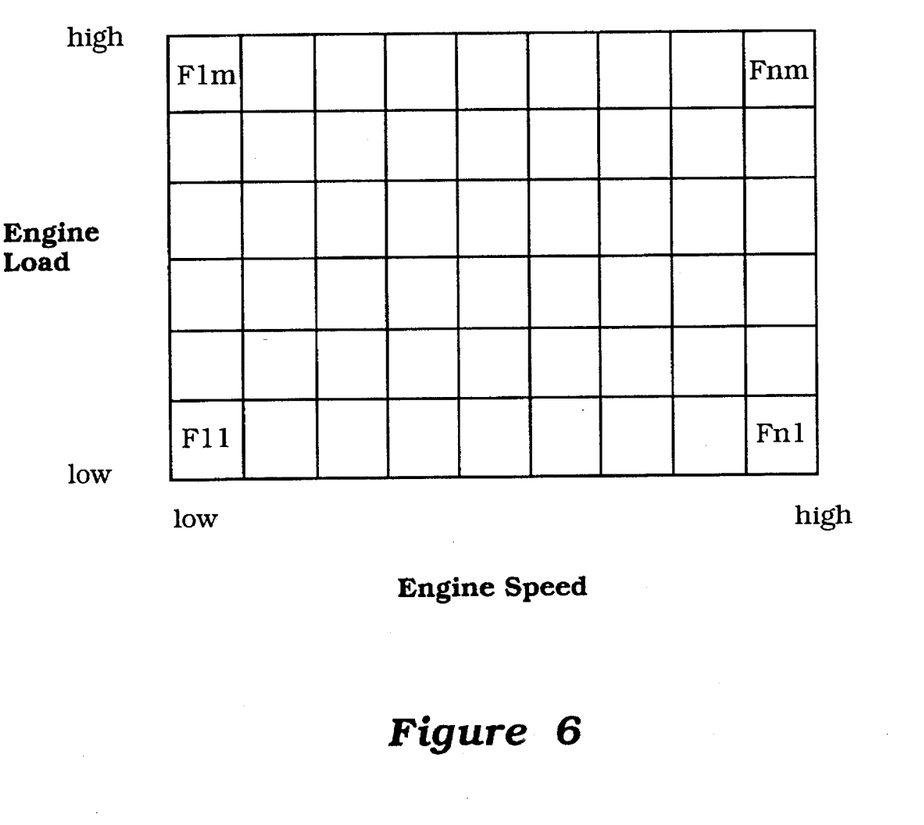
FIG. 6 is a map showing the fuel/air amount when non-feedback control is being accomplished.

Also, as has been previously noted, if a misfire occurs, then there is a likelihood of fuel remaining on the sensor 81 and giving an incorrect lean reading which would cause the feedback control to output a control signal to provide further enrichment of the fuel which would cause further misfiring tendencies. Therefore, a control routine is provided in the ECU 66 so that when a condition of leanness for more than a predetermined time period exists, then the program assumes that there is a misfiring condition and the fuel amount is gradually reduced until the system reaches the desired air/fuel ratio and then returns to feedback control strategy. During this intermediate time period, the fuel injection amount is figured out by a basic map which is preprogrammed into the ECU 66 and which may take the form as shown in FIG. 6 wherein the fuel injection amount is determined by actual engine speed and engine load rather than the feedback signal. In addition to returning the engine running to a normal condition more promptly, this system also reduces the likelihood of damage to the oxygen sensor 81 by fuel and/or lubricant contamination.

Figure 5:
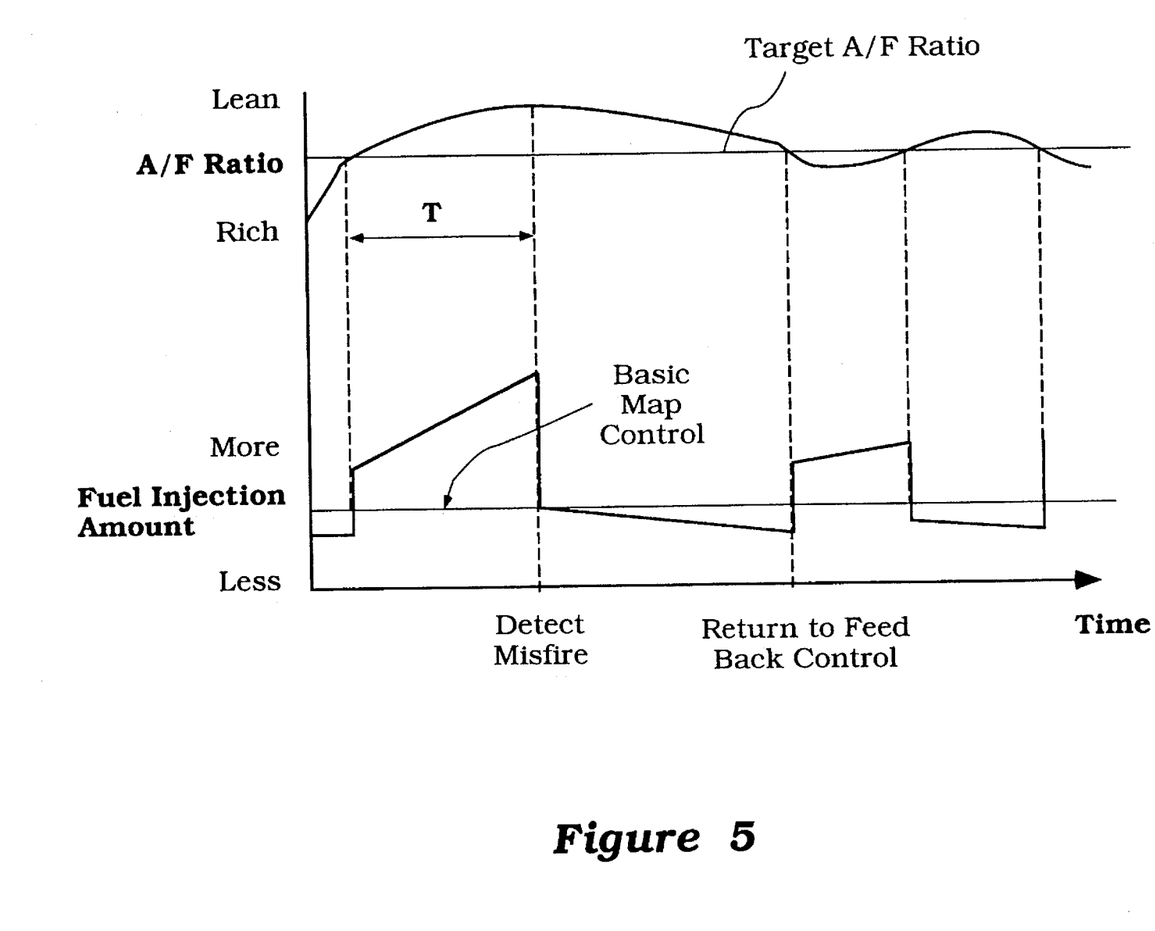
FIG. 5 is a graphical view showing the actual air/fuel ratio in the engine and the output of the sensor and control routine.
Figure 7:
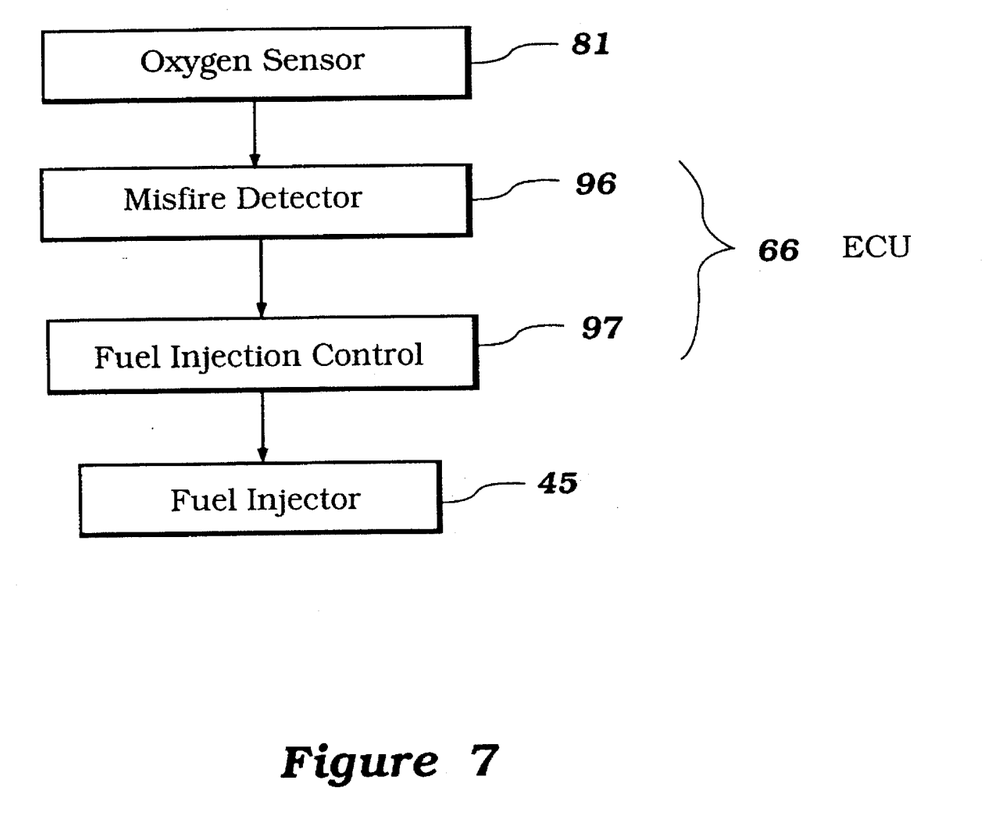
FIG. 7 is a partially schematic view showing the components of the system in block form and the manner in which control signals and sensor signals are transmitted from one component to the next.

The actual control strategy will now be described by particular reference to FIGS. 5 and 6. FIG. 5 being a time diagram during a control cycle showing the air/fuel ratio at the top of the figure in actual value and the fuel injection amount at the lower portion. The various control routine times will be indicated later. FIG. 7 shows schematically how the component in the ECU are interrelated.

Referring first to this figure, the ECU 66 includes a section which analyzes the results and determines when a misfire condition exists and this is indicated by the block 96. Also, there is provided the actual fuel injection control block and this is indicated at 97. Hence, the oxygen sensor 81 outputs its signal to the misfire detector 96 and then a signal, as will be described, is transferred to the fuel injection control 97 and the fuel injector 45 is then controlled. The control for the fuel injector 15 may vary only the injection duration or the duration and/or timing. Basically, the amount of fuel is controlled by the duration with the longer duration providing a richer mixture.

During the time period when the misfire condition is detected by the detector 96, then the map of FIG. 6 is resorted to for actually determining the injection amount in relation to engine conditions such as engine speed and engine load. The program begins at the left-hand side of FIG. 5 when there is a feedback control existent and the output of the oxygen sensor is employed so as to change the fuel injection amount in steps.

It will be seen that at the time t1 the sensor goes to a condition indicating that the mixture is lean and this is determined by the output as seen in FIG. 4. When this occurs, the basic strategy of the feedback control is to increase the amount of fuel injection in steps so as to bring the mixture back to the stoichiometric ratio. However, at the time t1 when the sensor 81 indicates a lean condition, a timer is started to run for the time T.

If the mixture stays lean for this time period T then it is determined that there has been a misfire condition exists and instead of continuing to increase the amount of fuel injection as seen by the sloped curve during the time period T, the program then moves to the map control by reading the map of FIG. 6 and dropping the injection amount to that set by this map for the speed and load condition of the engine.

After this occurs, the program then continues to decrease the fuel injection amount with certain increments in certain time periods and this is continued until the air/fuel ratio sensor again indicates a rich condition. The system then returns back to feedback control and so long as the output of the sensor does not indicate a lean condition for more than the time period T normal feedback control is maintained because it is assumed that no misfire condition has occurred.

Thus, it should be readily apparent from the foregoing description that the described embodiment of the invention is very effective in providing good exhaust emission control and fuel economy for an engine. Although the invention has been described in conjunction with two-cycle engines where it has particular utility, the invention may also be employed in conjunction with four-cycle engines under some circumstances. Various other changes and modifications may be made without departing from the spirit and scope of the invention, as defined by the appended claims.

We claim:

1. A feedback control system for an internal combustion engine having a combustion chamber, a charge forming and induction system for supplying a fuel/air charge to said combustion chamber, an exhaust system for discharging exhaust gases from said combustion chamber, combustion chamber sensor means for sensing the condition of the combustion products within said combustion chamber, feedback control means for controlling the charge forming system for varying the fuel/air ratio in response to the output of said combustion condition sensor, means for sensing a misfiring condition, and means for discontinuing the feedback control when a misfire is detected and for reducing the amount of fuel supplied by said charge-forming system until the misfire condition is stopped.

2. A feedback control system for an internal combustion engine as set forth in claim 1, wherein the combustion condition sensor senses the combustion products directly from the combustion chamber.

3. A feedback control system for an internal combustion engine as set forth in claim 2, wherein the engine operates on a two-stroke crankcase compression principle and the combustion products are sensed by communicating the combustion condition sensor with the combustion chamber through a port juxtaposed to open at approximately the same time as the engine exhaust port opens.

4. A feedback control system for an internal combustion engine as set forth in claim 3, wherein the combustion product sensor is positioned in a conduit interconnecting the port with a port in another combustion chamber operating on a different cycle for maintaining a constant flow of combustion products to the combustion condition sensor on each cycle of operation of the first-mentioned combustion chamber.

5. A feedback control system for an internal combustion engine as set forth in claim 1, wherein the misfire condition is determined when the fuel/air ratio is determined by the combustion condition sensor to be lean for more than a predetermined time period.

6. A feedback control system for an internal combustion engine as set forth in claim 5, wherein the fuel/air ratio is adjusted by decreasing the amount of fuel supplied by the charge-forming system to an amount determined by a map of engine conditions.

7. A feedback control system for an internal combustion engine as set forth in claim 6, wherein the map of conditions are at least engine speed and load.

8. A feedback control system for an internal combustion engine as set forth in claim 6, wherein the amount of fuel supplied is decreased from the amount determined by the map in incremental levels until the misfire condition ceases to exist.

9. A feedback control system for an internal combustion engine as set forth in claim 8, wherein the map conditions are at least engine speed and load.

10. A feedback control system for an internal combustion engine as set forth in claim 9, wherein the combustion condition sensor senses the combustion products directly from the combustion chamber.

11. A feedback control system for an internal combustion engine as set forth in claim 10, wherein the engine operates on a two-stroke crankcase compression principle and the combustion products are sensed by communicating the combustion condition sensor with the combustion chamber through a port juxtaposed to open at approximately the same time as the engine exhaust port opens.

12. A feedback control system for an internal combustion engine as set forth in claim 11, wherein the combustion condition sensor is positioned in a conduit interconnecting the aforenoted port with a port in another combustion chamber operating on a different cycle for maintaining a constant flow of fresh combustion products to the combustion condition sensor on each cycle of operation of the first-mentioned combustion chamber.

13. A feedback control method for an internal combustion engine having a combustion chamber, a charge forming and induction system for supplying a fuel/air charge to said combustion chamber, an exhaust system for discharging exhaust gases from said combustion chamber, said method comprising the steps of sensing the condition of the combustion products within said combustion chamber, feedback controlling the charge forming system for varying the fuel/air ratio in response to the combustion product condition, sensing a misfiring condition, and discontinuing the feedback control when a misfire is detected and reducing the amount of fuel supplied by said charge-forming system until the misfire condition is stopped.

14. A feedback control method for an internal combustion engine as set forth in claim 13, wherein the combustion products are sensed directly from the combustion chamber.

15. A feedback control method for an internal combustion engine as set forth in claim 14, wherein the engine operates on a two-stroke crankcase compression principle and the combustion products are sensed by communicating a combustion condition sensor with the combustion chamber through a port juxtaposed to open at approximately the same time as the engine exhaust port opens.

16. A feedback control method for an internal combustion engine as set forth in claim 15, wherein the combustion condition sensor is positioned in a conduit interconnecting the aforenoted port with a port in another combustion chamber operating on a different cycle for maintaining a constant flow of fresh combustion products to the combustion condition sensor on each cycle of operation of the first-mentioned chamber.

17. A feedback control method for an internal combustion engine as set forth in claim 13, wherein the misfire condition is determined when the fuel/air ratio is determined to be lean for more than a predetermined time period.

18. A feedback control method for an internal combustion engine as set forth in claim 17, wherein the fuel/air ratio is adjusted by decreasing the amount of fuel supplied by the charge-forming system to an amount determined from a map of engine conditions.

19. A feedback control method for an internal combustion engine as set forth in claim 18, wherein the map engine conditions are at least engine speed and load.

20. A feedback control method for an internal combustion engine as set forth in claim 18, wherein the amount of fuel supplied is decreased from the amount determined by the map in incremental levels until the misfire condition ceases to exist.

21. A feedback control method for an internal combustion engine as set forth in claim 20, wherein the map engine conditions are at least engine speed and load.

22. A feedback control method for an internal combustion engine as set forth in claim 21, wherein the combustion condition sensor senses the combustion products directly from the combustion chamber.

23. A feedback control method for an internal combustion engine as set forth in claim 22, wherein the engine operates on a two-stroke crankcase compression principle and the combustion products are sensed by communicating the combustion condition sensor with the combustion chamber through a port juxtaposed to an opening at approximately the same time as the engine exhaust port opens.

24. A feedback control method for an internal combustion engine as set forth in claim 23, wherein the combustion condition sensor is positioned in a conduit interconnecting the aforenoted port with a port in another combustion chamber operating on a different cycle for maintaining a constant flow of fresh combustion products to the combustion condition sensor on each cycle of operation of the first-mentioned chamber.

* * * * *